Jan. 7, 1941. G. J. STREZYNSKI 2,227,851

SEWAGE DISPOSAL

Filed Aug. 2, 1937

INVENTOR
George J. Strezynski
BY
Besser and Harding
ATTORNEYS.

WITNESS:
Robt R Mitchel.

Patented Jan. 7, 1941

2,227,851

UNITED STATES PATENT OFFICE 2,227,851

SEWAGE DISPOSAL

George J. Strezynski, Poughkeepsie, N. Y., assignor to The De Laval Separator Company, New York, N. Y., a corporation of New Jersey Application August 2, 1937, Serial No. 156,901

6 Claims. (Cl. 210—2)

My invention constitutes an improved process for disposal of sewage from congested districts. Even a small city of 40,000 inhabitants may have a sewage flow of 5,000,000 gallons per day.

One method of disposal of such sewage is to first settle out the coarse material, called primary sludge and then, by blowing air through the effluent, or by trickle filtering it through broken rock or gravel, accelerate the growth of living organisms therein. Many of these are plant-like or hair-like, sometimes reaching a length of many feet. As they develop they have an enmeshing action on the fine solids remaining in the liquid and, when settling, carry them down into a soft wet "secondary" sludge at the bottom of the tank. Because of their springy nature they form a loose open mass containing usually between 1% and 2% solids.

The object of my invention is the concentration of this wet "secondary" sludge into a relatively dry one.

I have found that if this wet sludge is forced, at high pressure, through a small orifice (for example, an orifice one thirty-second of an inch in diameter has been found effective), these hair-like or plant-like growths or organisms are broken up and may be so concentrated as to contain 10 to 12% of solids. These growths may be broken up by using a high pressure force pump to drive the sludge containing them through several small holes, which must, of course, be arranged so that they are accessible for cleaning when closed by extra large and strong particles of solid, and the concentration may be afterward effected in a centrifuge having orifices through its peripheral wall, such as that of the Adams Patent No. 1,738,553; or the breaking up of the growths and their centrifugal separation may, and by preference are, effected simultaneously in a centrifuge of the type shown in my previously issued Patent No. 2,022,814. If a centrifuge of the type disclosed in my said patent be employed, I prefer to utilize the improvement thereon disclosed in my pending application filed May 18, 1937, Serial No. 143,289, in which the pressure to force the sludge through the orifices is caused by centrifugal force and any large particles that might tend to close the orifices are broken up by the intermittent pounding of the floating valves, as hereinafter more particularly described.

The accompanying drawing illustrates an apparatus adapted to carry out my improved process.

Figure 1:
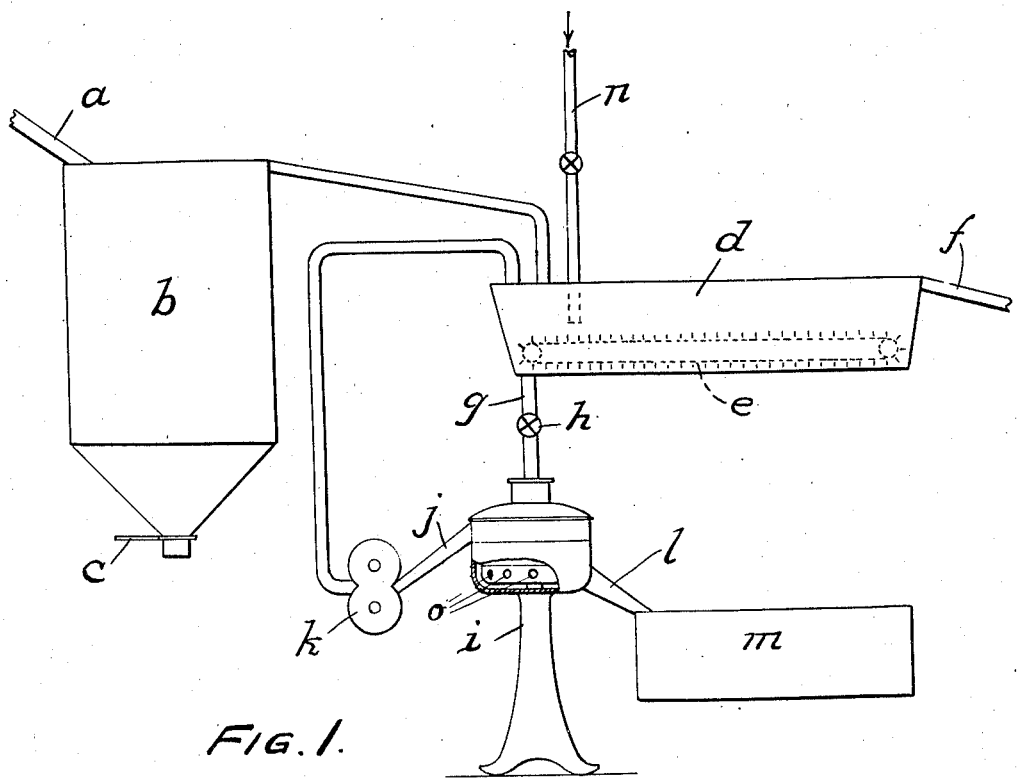
Figure 2:
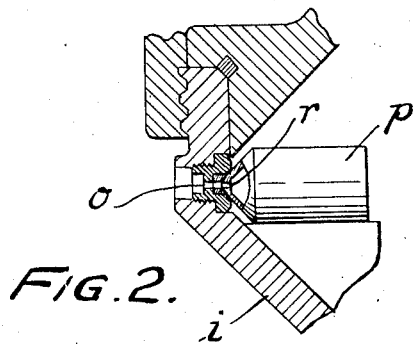

Fig. 1 is an elevational view, largely diagrammatic, of the general apparatus. Fig. 2 is a vertical sectional view of a part of the separator bowl, comprising one of the orifices through which the concentrated sludge is discharged and the radially floating valve that is adapted to intermittently open and close said orifice and by its pounding action break up large particles tending to close the orifice.

$a$ is a sewage inlet pipe to a primary settling tank $b$ having an intermittently openable solids outlet $c$ at its bottom. $d$ is a secondary settling tank having a conveyor $e$ in its bottom. $f$ is an outlet for effluent. $g$ is an outlet for solids controlled by a gate $h$, leading to a centrifuge $i$. From the centrifuge an effluent pipe $j$, containing a pump $k$, leads back to tank $d$; and a sludge outlet $l$ leads to a tank $m$. In the drawing the size of the centrifuge is exaggerated many times relative to that of the other elements of the apparatus. $n$ is an inlet pipe for compressed air.

In operation the sewage flows into the primary settling tank $b$, in which the coarser solids settle and are removed through the intermittently operable outlet $c$. The effluent from $b$ passes to the secondary settling tank $d$ and is aerated by air from pipe $n$, causing a rapid growth of certain forms of organisms which settle and in so doing carry down nearly all of the other solids, leaving the effluent so clean that it may be discharged to a stream. The conveyor $e$ carries the secondary sludge, containing 1% to 2% solids, to the discharge pipe $g$, through which it flows into the centrifuge $i$. Here the solids, including the fibrous growths, are thrown out against the bowl wall. Centrifugal force partly breaks up the growths, and the pressure (which, in a 13 inch bowl revolving 6000 R. P. M., is between 700 and 800 lbs. per sq. in.), by forcing them through the outlets in the periphery of the bowl, continues the breaking-up action. If a particle too large to pass through one of the ports enters it while it is open, the first closing stroke of the valve will break it up and force it through the port.

This sludge, which is relatively dry, containing 8 to 12% of solids as determined by drying, is discharged through the spout $l$ into the tank $m$.

The liquid, containing only a very minor portion of the finest solids, escapes through the spout $j$ and is pumped back to the secondary settling tank $d$, wherein these fine solids are settled.

The operation of mechanically breaking up the solids in the centrifugal separator $i$ will be understood by reference to Fig. 2, which shows, in vertical section, part of the bowl of a centrifugal separator $i$, such as disclosed in my said application for patent. The peripheral wall of the bowl is provided with a number of ports $o$ for the discharge of the heavier separated constituents. A radially floating hollow valve $p$ (one for each port) is movable inward and outward and is adapted in such movement to alternately open and close communication between the interior of the bowl and the port and also, in its outward movement, to hammer and break up any collection of solids around the port. The valve has an opening $r$ in its outer conical end, the communication of which with the interior of the valve is opened and closed as the valve moves inward and outward but is always in communication with port $o$. When the valve is in its outer port-closing position, liquid contained therein is discharged therefrom through the orifice $r$ and through the port until the valve is thereby so lightened in weight that it floats inward and opens the port $o$. Immediately, liquid enters the valve from the bowl until its weight is so increased that it again moves outward and closes port $o$. The opening in the valve should be of such size that the valve is adapted to quickly more or less fill and empty, thereby so rapidly changing its gross weight, that its outward and inward movement will be so frequent as to result in a rapid succession of hammer blows against the valve seat and thereby break up fibrous material and large solids.

It will be understood that the execution of the process is not dependent upon the use of the apparatus shown nor upon the employment of a separator of the particular construction described; these features being herein described in some detail to enable those skilled in the art to practice the process, without the necessity of experiment, by means which I have found most efficient.

What I claim and desire to protect by Letters Patent is:

1. Process of disposal of sewage which comprises settling of coarser solids into a primary sludge and separating the effluent therefrom, accelerating growth of living organisms in the effluent, settling the same into a wet secondary sludge and separating therefrom the supernatant liquid, said secondary sludge comprising the remaining solids including said growths and considerable liquid, subjecting the said secondary sludge to centrifugal force and thereby separating a concentrated sludge comprising most of said growths and solids with a minor part of the liquid from the major part of the liquid and a minor proportion of said growths and solids, and simultaneously with said centrifugal operation subjecting the sludge to mechanical force to break up said growths.

2. Process of disposal of wet secondary sewage sludge from which coarser solids have been removed and containing branch and hairlike growths which comprises conveying the secondary sludge to a locus of high pressure and under that pressure subjecting them to mechanical force and at the same time forcibly discharging them, together with a minor part of the liquid, through small holes, the two actions cooperating to break up the growths, and separating from the discharged mixture the major proportion of the liquid of the secondary sludge.

3. Process of disposal of sewage which comprises settling of coarser solids into a primary sludge and separating the effluent therefrom, accelerating growth of living organisms in the effluent, settling the same and solids carried down therewith into a wet secondary sludge and separating therefrom the supernatant liquid, subjecting the wet secondary sludge to centrifugal force while simultaneously subjecting said growths to a mechanical action and discharging them through a small orifice and thereby breaking up the growths, and separating the bulk of the same from the major part of the liquid associated therewith, and continuously and separately discharging the major part of the separated liquid.

4. Process of disposal of sewage which comprises settling of coarser solids into a primary sludge and separating the effluent therefrom, accelerating growth of living organisms in the effluent, settling the same into a wet secondary sludge and separating therefrom the supernatant liquid, and breaking up these growths and centrifugally separating the major portion thereof from the major part of the liquid associated therewith, continuously separately removing the separated constituents, and conveying such separated major part of the liquid, together with any minor proportion of solids mixed therewith, to the locus of secondary sludge settlement.

5. Process of disposal of sewage which comprises settling coarser solids into a primary sludge and separating the effluent therefrom, accelerating growth of living organisms in the effluent, settling the same and solids carried down therewith into a wet secondary sludge and separating therefrom the supernatant liquid, subjecting the wet secondary sludge to centrifugal force and thereby separating a mixture of a major proportion of solids and a minor proportion of the liquid from the major proportion of the liquid, and, while said force continues operative, discharging the said mixture through small orifices and separately discharging the separated major proportion of liquid together with any minor proportion of solids mixed therewith.

6. Process of disposal of wet secondary sewage sludge from which coarser solids have been removed and containing branch and hairlike growths which comprises conveying the secondary sludge to a locus of high pressure and under that pressure continuously forcibly discharging said hairlike growths, together with some of the liquid, from said locus through holes sufficiently small to break them up, and separating from said discharged mixture the major proportion of the liquid of the secondary sludge.

GEORGE J. STREZYNSKI.